C. W. JONES.
SPLIT PULLEY.
APPLICATION FILED DEC. 16, 1912.

1,120,202.

Patented Dec. 8, 1914.

Witnesses.
C. K. Davis
M. L. Newcomb

Inventor
Charles W. Jones
Herman A. Phillips
Attorney

UNITED STATES PATENT OFFICE.

CHARLES W. JONES, OF SOUTH MILLS, NORTH CAROLINA.

SPLIT PULLEY.

1,120,202.  Specification of Letters Patent.  Patented Dec. 8, 1914.

Application filed December 16. 1912. Serial No. 737,059.

*To all whom it may concern:*

Be it known that I, CHARLES W. JONES, a citizen of the United States, residing at South Mills, in the county of Camden and State of North Carolina, have invented certain new and useful Improvements in Split Pulleys, of which the following is a specification.

My present invention relates to improvements in split pulleys, and is designed especially to provide a pulley which is simple in construction, comparatively cheap in cost, and which may be applied to or detached from a shaft with facility and rapidity.

In the application of pulleys to shafting in many instances, it is desirable that the pulley be applied at its point of use without the necessity of sliding the pulley over the end of the shaft after said shaft has been dismounted. With my construction of pulley, the two pulley sections may be applied from opposite sides of the shaft, and then by use of the simple interlocking keys, the two sections of the split pulley may be securely and firmly held together on the shaft.

The invention consists in the combination with the two sections of a split pulley of a plurality of locking keys or coupling plates adapted for use with the sections for holding them together, and in certain novel features in conjunction with the locking keys and complementary parts of the split pulley by which this purpose is accomplished.

In the accompanying drawings I have illustrated one example of the physical embodiment of my invention constructed according to the best mode I have so far devised for the practical application of the principles of the invention.

Figure 1:
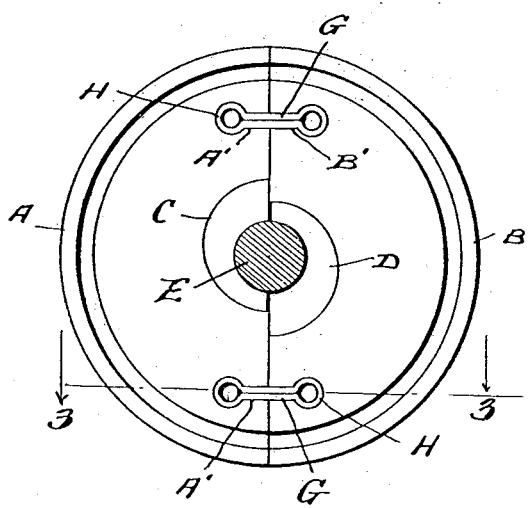
Figure 2:
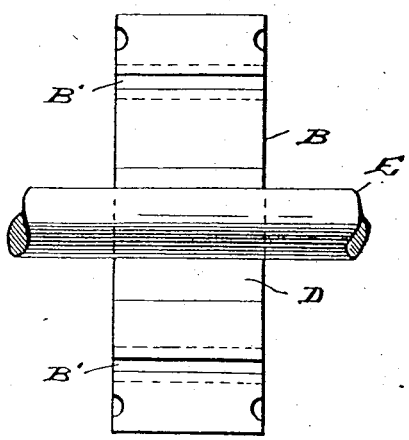
Figure 3:
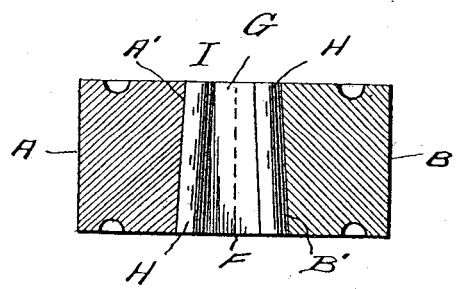
Figure 4:
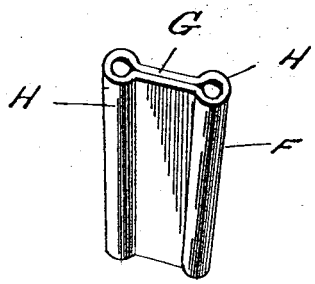

Figure 1 is a side elevation of a split pulley constructed according to my invention. Fig. 2 is an elevation showing one edge of one of the half sections of the split pulley. Fig. 3 is a horizontal sectional view on line 3—3 Fig. 1. Fig. 4 is a perspective view of one of the locking keys.

In the accompanying drawings I have illustrated the preferred form of my invention as embodied in a rotary element known as a "split pulley", but it will of course be understood that the invention is equally applicable to other rotary devices as rope sheaves, trolley wheels, fly wheels, gears, etc., and while I shall hereinafter refer to the device as a split pulley, it will be evident that the appended claims apply as well to the above mentioned devices, and others, when applied thereto in actual and physical use.

The split pulley comprises the two usual sections A and B, and these sections are formed with the eccentrically arranged bushings or sleeves C and D, which, as usual clamp tightly on the shaft E when the wheel is rotated in the proper direction.

The pulley sections and bushing illustrated are of suitable wood or metal, while the key designated by the letter F is preferably of metal. The locking key F as shown is made of tubular material which is flattened to provide the blade G with the two tubular locking members or tongues H. It will of course be understood that the key may be of solid wrought iron or steel for instance, but by using the tubular metal a key possessing a desirable degree of elasticity is provided which enhances the efficiency of the key in locking the two sections together.

The key is adapted to lock the two sections of the pulley together, and in the drawings I have illustrated two of the keys, although more keys may be used if desired. At opposite points on the jointed face of the sections are provided complementary slots as A′ A′ and B′ B′, which are provided with enlarged recesses, cylindrical in shape, and these alining slots and recesses form, at diametrical points of the pulley, sockets or pockets for the reception of a key. In Fig. 3 it will be seen that the pocket is formed in the shape of a wedge, or is tapered from one face of the pulley toward the other face, and the key is shown in place joining the two sections of the pulley.

The key is driven into the grooves or slots from the narrow side, as at point I of the pulley in Fig. 3, with the wide end of the key entered first. Thus, after the two sections of the pulley have been located in proper position on the shaft, the two sections are held sufficiently apart to permit the wide end of the key to be entered into the narrow end of the pocket (point I). The key is driven into the pocket by blows from a hammer, and the entrance of the key into the pocket draws the two sections together, so that when the two keys are driven home, as in Fig. 1, the sections are rigidly and securely held together. It will of course be understood that the maximum width of the pocket is not greater than the maximum width of the key.

The elasticity of the tubular metallic keys enhances the efficiency of the locking device in that the keys are less liable to become displaced, and the keys hold the parts together with rigid compactness.

Having thus fully described my invention, what I claim is:—

1. The combination with two sections of a driven member having complementary slots extending from their adjoining faces and an enlarged recess at the base of each slot, of an elastic metallic key comprising a flat, split body portion having at each edge an integral cylindrical tubular locking tongue, the pair of tongues being arranged on converging lines.

2. A key of elastic metal for the purpose described comprising a split, flat body portion having converging edges formed of integral cylindrical tubular locking tongues.

In testimony whereof I affix my signature in presence of two witnesses.

CHAS. W. JONES.

Witnesses:
J. F. FOSTER,
W. I. HALSTEAD.

Copies of this patent may be obtained for five cents each, by addressing the "Commissioner of Patents, Washington, D. C."